July 11, 1961
J. H. ALDEN
2,991,851
ROTATABLE BRAKE DRUM
Filed Sept. 26, 1958
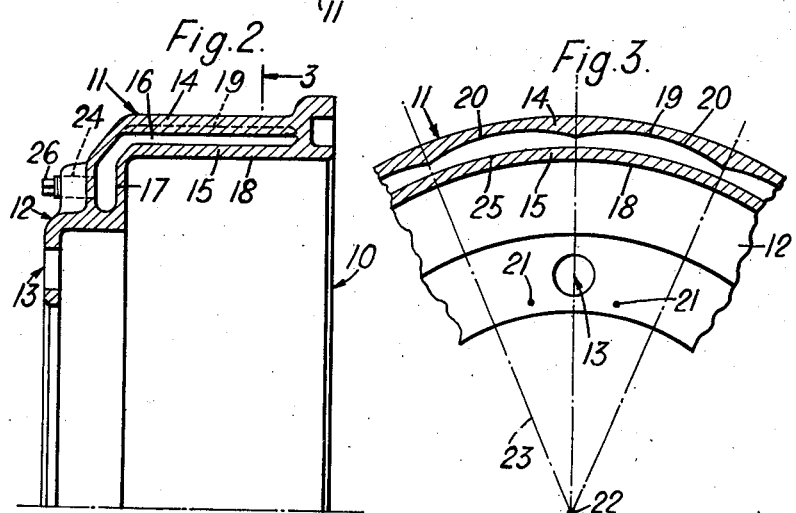
Inventor
John H. Alden
By D. C. Staley
his Attorney

United States Patent Office 2,991,851
Patented July 11, 1961

2,991,851
ROTATABLE BRAKE DRUM
John H. Alden, Harpenden, England, assignor to General Motors Corporation, Detroit, Mich., a corporation of Delaware
Filed Sept. 26, 1958, Ser. No. 763,624
Claims priority, application Great Britain Oct. 9, 1957
5 Claims. (Cl. 188—218)

This invention relates to rotatable brake drums for use, for example, on the wheels of motor vehicles and aircraft.

Upon the application of brake shoes of a stationary brake mechanism to such a drum during high speed rotation of the drum, deceleration of the drum occurs and, due to friction, the temperature of the friction surface of the drum rises. If the rise in temperature is excessive it may cause the occurrence of the phenomenon known as "brake fade." To minimize this brake fade it has been proposed to form a drum with an annular chamber surrounding a friction surface thereof and partially to fill the chamber with coolant liquid. During high speed rotation of the drum however, the coolant liquid tends to accumulate in the outer portions of the chamber out of contact with that portion of the drum adjacent the friction surface thereof. Accordingly the cooling effect of the coolant liquid is reduced.

The present invention seeks to overcome this difficulty.

Accordingly a rotatable brake drum includes an annular portion which has an outer wall and an inner wall between which is an annular closed chamber partially filled with coolant liquid, the inner wall having an external peripheral friction surface facing radially inwardly and an internal surface within the chamber, the outer wall having an undulated internal surface and the undulations being more concave than the friction surface, whereby coolant liquid is directed on to the internal surface of the inner wall upon a sudden deceleration of the drum during rotation thereof.

Further objects and advantages of the present invention will be apparent from the following description, reference being had to the accompanying drawings, wherein two preferred embodiments of the invention are clearly shown.

In the drawings:

FIGURE 1 is a perspective view of a brake drum to which the present invention is applicable;

FIGURE 2 is one half of a vertical cross section of one form of brake drum in accordance with the present invention;

FIGURE 3 is a fragmentary cross section in the direction of the arrows 3—3 of FIGURE 2;

FIGURE 4 is a fragmentary cross section, similar to FIGURE 3, of another form of brake drum in accordance with the present invention;

FIGURE 5 is a fragmentary cross section, similar to FIGURE 4, with the parts in the position assumed during constant brake drum rotation; and FIGURE 6 is a view, similar to FIGURE 5, with parts in the position assumed upon drum deceleration.

A rotatable brake drum 10 of annular form has a rim portion 1 and a stepped radial flange portion 12. The latter is apertured at 13 to receive bolts by which the brake drum 10 can be secured to a vehicle axle and by which a vehicle wheel can be secured thereto. The rim portion 11 has an outer wall 14 and an inner wall 15 (FIG. 2) between which is an annular chamber 16. The chamber 16 is closed and extends into a part 17 of the radial flange portion 12 between the step and the rim portion 11. The inner wall 15 of the rim portion 11 has an external peripheral friction surface 18 facing radially inwards and intended for engagement by brake shoes of a stationary brake mechanism (not shown). The inner wall 15 also has an internal cylindrical surface 25 within the chamber 16.

The outer wall 14 of the rim portion has an undulated internal surface 19 within the closed chamber 16. The undulated surface 19 comprises a series of adjacent part-cylindrical surfaces 20 whose axes 21 lie radially outwards of and parallel to the rotational axis 22 of the drum 10. Each axis 21 lies approximately midway between the radial planes 23 through the rotational axis 22 of the drum and the limits of the part-cylindrical surface 20, which are at positions nearest the rotational axis 22. Clearly, the recesses formed by the surfaces 20 are more concave than the surface 25.

The chamber 16 has three filling holes 24, each closed by a screw plug 26, in the part 17 of the radial flange portion 12 and is partially filled with a coolant liquid. The liquid may be, for example, water, saline solution or glycol. The requirements are that the liquid possess a high latent heat of evaporation and a boiling point somewhat below the desirable maximum temperature of the drum so that, even under pressure caused by the boiling, boiling occurs at the desirable maximum temperature of the drum.

In operation, when the drum 10 is rotated at high speed, the coolant liquid accumulates against the undulated internal surface 19 of the outer wall 14 of the rim portion 11 of the drum, mainly in the recesses formed between the limits of the part-cylindrical surfaces 20, and is thus out of contact with the internal surface 25 of the inner wall 15.

Upon the application of brake shoes to the friction surface 18 of the inner wall 15, the drum is decelerated and, due to friction, the temperature of the inner wall 15 of the rim portion 11 of the drum rises. Due to its angular momentum, the liquid in the chamber 16 tends to continue rotating at the former speed of rotation of the drum. This causes the liquid accumulated in the recesses formed by the surfaces 20 to move peripherally along the undulations and thus to be moved radially inwards. This inward movement causes coolant liquid to be directed onto the internal surface 25 of the inner wall 15 to cool the latter.

If due to the degree of braking, the temperature of the inner wall 15 reaches the normal boiling point of the coolant liquid, the latter evaporates and, because of its high latent heat of evaporation, prevents an excessive rise in temperature. The actual temperature of the inner wall 15 will be determined by the pressure within the chamber caused by the evaporation of the liquid which raises the boiling point of the liquid.

The brake drum 10 hereinbefore described can be used in either direction of rotation and is thus particularly suitable for use in motor vehicles where the brake drums may be changed from one side to the other, although the brake drum can also be applied to any kind of machinery.

Where the direction of rotation of the part to be braked is constant, an alternative form of brake drum, shown in FIG. 4, can be used. In this case, the undulations are formed in steps. Similar parts carry the same reference numerals in FIGS. 3 and 4.

The undulated internal surface 19 of the outer wall 14 within the closed chamber 16 comprises a series of adjacent part-cyclindrical surfaces 30 whose axes 31 lie radially outwards of and parallel to the rotational axis 22 of the drum. The limits of each part-cylindrical surface 30 are at positions nearest to and farthest from the rotational axis 22 and the axis 31 of each part cylindrical surface 30 is on the radial plane 31 joining the rotational axis 22 of the drum to the limit of the surface farthest from the rotational axis, which plane includes the limit of the adjacent part cylindrical surface 30 nearest the rotational axis 22 and also the step 33 between the adjacent surfaces 30. Here again the recesses formed by the steps 33 and surfaces 30 are more concave than the surface 25. Filling holes 34 are provided in the rim portion 11 instead of the flange portion 12 and are closed by plugs 35.

In operation, when the drum is rotated in the direction of the arrow A at high speed, the coolant liquid accumulates against the undulated internal surface of the outer wall of the rim portion of the drum, mainly in the recesses formed by the steps 33 and surfaces 30, and is thus out of contact with the internal surface 25 of the inner wall, as shown in FIGURE 5.

Upon the application of brake shoes to the friction surface of the inner wall, the drum is decelerated. Due to angular momentum, the liquid in the chamber 16 tends to continue rotating at the former speed of rotation of the drum. This causes the liquid accumulated in the recesses formed by the steps 33 and curves 30 to move peripherally along the undulations and thus to be moved radially inwards. This inward movement causes coolant liquid to be directed onto the internal surface of the inner wall, as shown in FIG. 6.

While the embodiments of the invention as hereinbefore disclosed constitute preferred forms, it is to be understood that other forms might be adopted as may come within the scope of the claims which follow.

What is claimed is as follows:

1. A rotatable brake drum having a rotational axis and including an annular portion having an outer wall and an inner wall between which is an annular closed chamber partially filled with coolant liquid, the inner wall having an external peripheral friction surface facing radially inwardly and an internal surface within the closed chamber, and the outer wall having an undulated internal surface formed as a sequential series of part-cylindrical surfaces having axes which are radially outwards of the rotational axis of the drum.

2. A drum according to claim 1, wherein each axis of a part-cylindrical surface lies approximately midway between planes including the rotational axis of the drum and the limits of the part-cylindrical surface.

3. A rotatable brake drum having a rotational axis and including an annular portion having an outer wall and an inner wall between which is an annular closed chamber partially filled with coolant liquid, the inner wall having an external peripheral friction surface facing radially inwardly and an internal surface within the closed chamber, and the outer wall having an undulated internal surface formed as a discontinuous series of part-cylindrical surfaces having axes which are radially outwards of the rotational axis of the drum.

4. A drum according to claim 3, wherein each axis of a part-cylindrical surface lies in a plane including the rotational axis of the drum and the limit of the part-cylindrical surface which is rearmost in the direction of rotation.

5. A drum according to claim 4, wherein adjacent part-cylindrical surfaces are joined by radial steps.

References Cited in the file of this patent

UNITED STATES PATENTS

| | | |
|---|---|---|
| 1,591,942 | Newhouse | July 6, 1926 |
| 2,022,435 | Sanford | Nov. 26, 1935 |
| 2,104,558 | Guggenheim | Jan. 4, 1938 |
| 2,294,207 | Roberts | Aug. 25, 1942 |
| 2,299,208 | Bloss | Oct. 20, 1942 |
| 2,372,984 | Pierce | Apr. 3, 1945 |
| 2,436,758 | Middleton | Feb. 24, 1948 |

FOREIGN PATENTS

| | | |
|---|---|---|
| 759,942 | France | Dec. 6, 1933 |